US009809245B2

(12) United States Patent
László

(10) Patent No.: US 9,809,245 B2
(45) Date of Patent: Nov. 7, 2017

(54) BEARING FOR A BALL SCREW DRIVE

(71) Applicants: ThyssenKrupp Presta AG, Eschen (LI); ThyssenKrupp AG, Essen (DE)

(72) Inventor: Gergely László, Esslingen-Berkheim (DE)

(73) Assignee: THYSSENKRUPP PRESTA AG, Eschen (LI)

(*) Notice: Subject to any disclaimer, the term of this patent is extended or adjusted under 35 U.S.C. 154(b) by 0 days.

(21) Appl. No.: 15/308,156

(22) PCT Filed: May 4, 2015

(86) PCT No.: PCT/EP2015/059696
§ 371 (c)(1),
(2) Date: Nov. 1, 2016

(87) PCT Pub. No.: WO2015/169735
PCT Pub. Date: Nov. 12, 2015

(65) Prior Publication Data
US 2017/0072993 A1 Mar. 16, 2017

(30) Foreign Application Priority Data
May 6, 2014 (DE) .................. 10 2014 006 469

(51) Int. Cl.
*B62D 5/04* (2006.01)
*F16H 25/22* (2006.01)
(Continued)

(52) U.S. Cl.
CPC ......... *B62D 5/0448* (2013.01); *B62D 5/0424* (2013.01); *F16C 23/084* (2013.01);
(Continued)

(58) Field of Classification Search
CPC .. B62D 5/0445; B62D 5/0448; B62D 5/0424; B62D 3/06; F16C 23/082; F16C 23/084; F16C 35/073; F16C 35/0635
(Continued)

(56) References Cited

U.S. PATENT DOCUMENTS 3,004,803 A * 10/1961 Irwin ................... F16C 23/084
384/495
4,754,829 A * 7/1988 Shimizu ............... B62D 5/0424
180/446
(Continued)

FOREIGN PATENT DOCUMENTS

CA 2356766 * 9/2001 ................ F02C 7/06
DE 102009018674 A1 10/2010
(Continued)

OTHER PUBLICATIONS

Int'l Search Report for PCT/EP2015/059696 dated Jul. 7, 2015 (dated Jul. 14, 2015).
(Continued)

*Primary Examiner* — Anne Marie Boehler
(74) *Attorney, Agent, or Firm* — thyssenkrupp North America, Inc.

(57) ABSTRACT

A bearing for a ball screw drive may include a ball nut that is rotatable about a longitudinal axis and intended to receive a threaded spindle concentrically. The ball nut may be arranged in an inner ring and at least partially in an intermediate ring and an outer ring of the bearing. A belt pulley may be connected to the intermediate ring for rotation therewith, wherein an outer circumferential surface of the inner ring may be convex in some regions and an inner circumferential surface of the intermediate ring may be concave in some regions. The ball nut may be arranged in the bearing so as to be tiltable with respect to the belt pulley. The inner ring may be connected to the ball nut for rotation
(Continued)

therewith and may be immovable in an axial direction. The intermediate ring may be connected via spring elements to the inner ring for rotation therewith.

10 Claims, 1 Drawing Sheet

(51) Int. Cl.
  *F16H 25/24* (2006.01)
  *F16C 23/08* (2006.01)
  *F16H 25/20* (2006.01)
(52) U.S. Cl.
  CPC ......... *F16H 25/2204* (2013.01); *F16H 25/24* (2013.01); *F16C 23/082* (2013.01); *F16C 2326/24* (2013.01); *F16H 2025/2081* (2013.01); *F16H 2025/2096* (2013.01); *F16H 2025/2445* (2013.01)
(58) Field of Classification Search
  USPC ............... 180/443, 444; 384/495, 498, 535; 74/424.82, 89.23, 388 PS
  See application file for complete search history.

(56) References Cited

U.S. PATENT DOCUMENTS

| | | | | |
|---|---|---|---|---|
| 6,378,646 | B1 * | 4/2002 | Bugosh | ................ B62D 5/0427 180/444 |
| 9,376,139 | B2 * | 6/2016 | Laszlo | ................ B62D 5/0424 |
| 9,470,296 | B1 * | 10/2016 | Beyerlein | ........... F16H 25/2209 |

FOREIGN PATENT DOCUMENTS

| | | | | |
|---|---|---|---|---|
| DE | 102009020554 | A1 | | 11/2010 |
| DE | 102010003233 | A1 | | 9/2011 |
| DE | 102010029767 | A1 | | 12/2011 |
| DE | 102011117723 | A1 | | 5/2013 |
| EP | 1013896 | | * 6/2000 | ............. F01D 25/16 |
| WO | 03/076832 | | * 9/2003 | ............. F16H 25/24 |

OTHER PUBLICATIONS

English Language Abstract for DE102010003233A1.
English Language Abstract for DE102010029767.

* cited by examiner

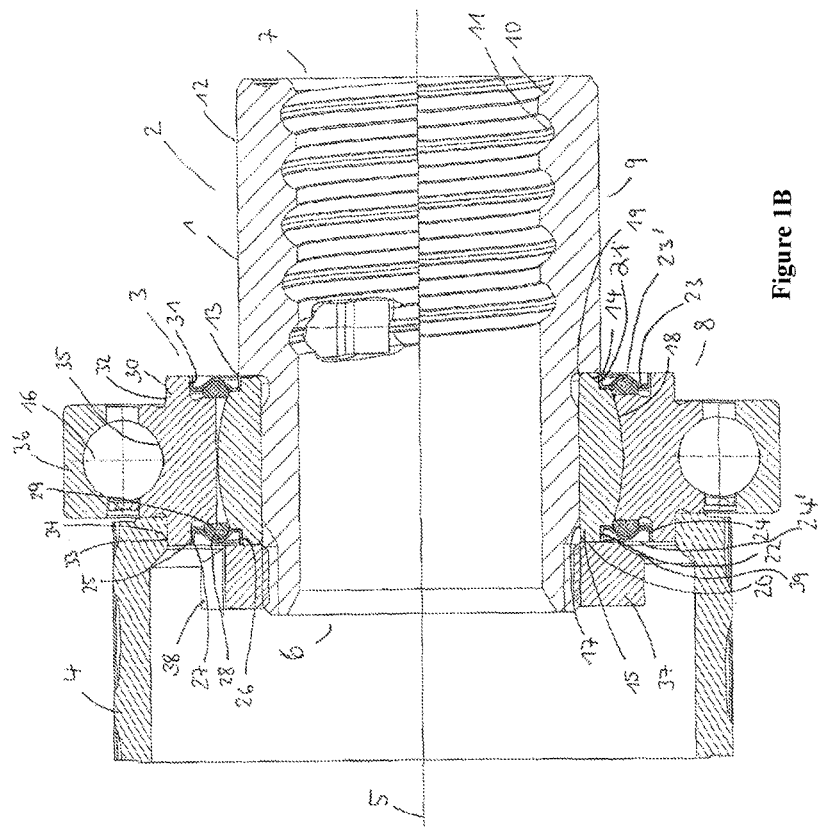
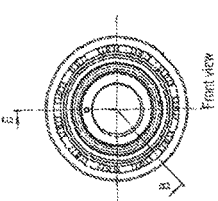
Figure 1A
Figure 1B

BEARING FOR A BALL SCREW DRIVE

CROSS REFERENCE TO RELATED APPLICATIONS

This application is a U.S. National Stage Entry of International Patent Application Serial Number PCT/EP2015/059696, filed May 4, 2015, which claims priority to German Patent Application No. DE 10 2014 006 469.7 filed May 6, 2014, the entire contents of both of which are incorporated herein by reference.

FIELD

The present disclosure relates to bearings of ball screw drives.

BACKGROUND

Ball screw drives are used in electromechanical power steering systems of motor vehicles. Such power steering systems have, on the one hand, racks and pinions or, on the other hand, belt drives for force transmission. In belt systems, the assisting motor is connected to the ball screw drive by means of a belt. The ball screw drive, consisting of a ball nut and threaded spindle, converts the rotary movement of the ball nut into a linear movement of the spindle, with the result that the rack is displaced in the axial direction to steer the wheels. The belt acts on the ball nut via a belt pulley connected to the ball nut for rotation therewith. Here, there is the risk of a drop in belt tension if, in the case of elastically supported ball screw drives, the ball nut tilts about its axial axis. Here, the belt is at least partially decoupled from the belt pulley or the motor, with the result that the assist force applied by the motor for steering is reduced. Moreover, the nonuniform stressing of the belt leads to an undesired reduction in its service life.

Particularly in the so-called curb pressure test, the ball screw drive is exposed to high loads. The curb pressure test is carried out for production vehicles to determine the rack diameter of the steering system.

DE 10 2010 003 233 A1 discloses a ball screw drive of a motor vehicle steering system with a ball nut which is mounted in a frame by means of a rolling bearing, wherein an elastomer is provided between the rolling bearing and the frame, which elastomer supports the rolling bearing in a prestressed manner with respect to the frame and prevents sound conduction from the interior of the steering gear via the rolling bearing to the outside.

DE 10 2010 029 767 A1 discloses a ball screw drive for motor vehicle steering systems, in which the airborne-sound radiation is reduced to a minimum. For this purpose, the ball nut is mounted in a housing via a bearing, wherein the bearing has axial and radial damping devices which are arranged between the bearing and bearing seat.

The aforementioned ball screw drive bearing arrangements can partially compensate bearing-side bending moments and axial forces acting on the nut. However, a constant belt tension cannot be achieved with these embodiments.

DE 10 2011 117 723 A1 discloses a ball screw drive of a motor vehicle steering system, in which the ball nut is movable relative to the belt pulley in the axial and/or radial direction. Although the belt pulley is decoupled radially and/or axially to a certain degree from the ball nut, said decoupling is not sufficient to compensate the axial forces arising through special events, such as the curb pressure test.

BRIEF DESCRIPTION OF THE FIGURES

FIG. 1A is a front view of an example ball screw drive bearing.

FIG. 1B is a longitudinal section view of the example ball screw drive bearing taken across line B-B of FIG. 1A.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

One example object of the present disclosure concerns a bearing for a ball screw drive of a motor vehicle steering system that provides sufficient freedom of movement for the ball nut in order also to withstand special events, such as the curb pressure test, without damage to the ball screw drive. At the same time, decoupling of the movement of the ball nut with respect to the belt pulley must ensure a constant belt tension.

Accordingly, there is provided a bearing for a ball screw drive with a ball nut which is rotatable about a longitudinal axis and is intended for receiving a threaded spindle arranged concentrically therein, wherein the ball nut is arranged in an inner ring and at least partially in an intermediate ring and an outer ring of the bearing, and with a belt pulley which is connected to the intermediate ring for rotation therewith, wherein an outer circumferential surface of the inner ring is designed to be convex at least in certain sections and an inner circumferential surface of the intermediate ring is designed to be concave at least in certain sections, and wherein the ball nut is arranged in the bearing so as to be tiltable with respect to the belt pulley, and wherein the inner ring is connected to the ball nut for rotation therewith and so as to be immovable in the axial direction and the intermediate ring is connected via spring elements to the inner ring for rotation therewith. This bearing allows the drive torque to be transmitted from the belt pulley to the ball nut via spring elements. Here, the ball nut can be tilted in the bearing without the belt pulley tilting as well. The drop in belt tension mentioned at the outset is thus effectively avoided.

Here, the spring elements are preferably two spring rings which are each arranged in a cavity so as to be radially symmetrical about the longitudinal axis in the unloaded state.

Furthermore, it is advantageous if the shape of the spring elements is designed such that, during tilting of the ball nut, the change in the shape of the cavity is compensated. Consequently, the axial play of the bearing is compensated.

Preferably, the inner ring, on an outer circumferential side, and the intermediate ring, on an inner circumferential side, have, starting from their end sides, recesses for receiving the spring elements.

In an advantageous embodiment, the spring rings have an m-shaped profile which is formed by two horizontal regions and a vertical region with a centrally arranged bead.

The bead can serve as a seat for a damping body. Noise generation is largely reduced by this axial damping of the bearing.

The damping body is preferably an elastomer ring.

In an advantageous embodiment, the inner ring is arranged in a rotationally fixed manner and axially secured on the ball nut by means of a union nut.

Furthermore, it is preferred that the belt pulley is positively connected to the intermediate ring. Thus, it is also possible for high torques to be transmitted from the belt pulley to the intermediate ring.

FIG. 1A shows a front view of an example ball screw drive bearing. With respect to a section taken across line B-B of FIG. 1A, FIG. 1B more specifically shows a ball nut 1 of a ball screw drive 2, a rolling bearing 3 and a belt pulley 4. The ball nut 1 is designed to be hollow along a longitudinal axis 5 in order to receive a threaded spindle (not shown). The ball nut 1 has two open ends 6, 7. The first open end 6 is adjoined by a first region 8 to which the rolling bearing 3 is assigned and the second end 7 is adjoined by a second region 9 in which the ball nut 1 has a helical ball raceway 11 on the inner side 10. The first region 8 has a smaller outside diameter than the second region 9 of the ball nut 1. The peripheral shoulder 13 thus resulting on the outer side 12 of the ball nut 1 forms a seat 14 for an inner ring 15 of the rolling bearing 3. In the unloaded state, the rolling bearing 3 is arranged rotationally symmetrically about the longitudinal axis 5 of the ball screw drive 2. Furthermore, the rolling bearing 3 has a transverse axis 16 with respect to which the rolling bearing 3 is arranged mirror symmetrically in the unloaded state. The inner ring 15 is formed cylindrically on the inner side 17 and convexly on the outer side 18. On the outer side 18 of the inner ring 15, starting from the end faces 19, 20, there are provided cutouts 21, 22 for bearing a respective spring ring 23, 24. The spring rings 22, 23 have, in longitudinal section, a rounded off m shaped profile which is oriented so as to point toward the transverse axis 16 of the bearing 3. The m shaped profile is composed of in each case two horizontal regions 25, 26 and a vertical region 27. The vertical region 27 has centrally, pointing toward the transverse axis 16 of the bearing 3, a bead 28 which serves for receiving a rubber ring 29. An intermediate ring 30 is arranged between the rubber rings 29.

The intermediate ring 30 is formed substantially concavely on the inner side apart from two small angular regions. The intermediate ring 30 is formed cylindrically in said angular regions, in order to receive the inner ring during mounting. Here, the angular regions are preferably arranged offset by 180° in the circumferential direction.

The concave inner side of the intermediate ring 30 and the convex outer side of the inner ring 15 are formed such that their axes of symmetry correspond with the transverse axis 16 of the rolling bearing.

To receive the spring rings 23, 24, the intermediate ring 30 has cutouts 31 on the inner side starting from the end sides. The inner ring 15 and the intermediate ring 30 terminate with the end sides of the spring rings 23, 24. The spring rings 23, 24 are for the most part surrounded by the intermediate ring 30.

The outer side of the intermediate ring 30 likewise has, starting from the end sides, a respective cutout 32, 33. Here, the cutout 33 remote from the thread serves as a seat for the belt pulley 4. For this purpose, the belt pulley 4 has a projection 34 on the inner side with respect to the end side pointing toward the rolling bearing. The belt pulley 4 is pressed into the cutout 33 of the intermediate ring 30 that is remote from the thread or onto the intermediate ring 30 by means of this projection 34. Furthermore, the intermediate ring 30 has centrally arranged on the outer side a raceway 35 for receiving a rolling body. The rolling body is furthermore held in the raceway 35 by an outer ring 36.

The belt pulley 4 is designed such that its outer side is arranged approximately level with the center of the rolling body. On the outer side, the belt pulley 4 has a structure which increases frictional engagement with a belt (not shown).

On the side remote from the thread, the rolling bearing 3 is held in a rotationally fixed manner on the ball nut 1 by a union nut 37. For this purpose, the union nut 37 and the ball nut 1 have inter-engaging threads. Recesses 38 are provided in order to mount or demount the union nut 37 with a tool. On one end side, the union nut 37 terminates, in the mounted state, with the first end of the ball nut 1 and, on the other end side, the union nut 37 is in contact with the inner ring 15 and partially in contact with the spring ring 24. The union nut 37 has on the outer side a peripheral cutout 39 which points toward the end side close to the thread and which exposes part of the spring ring 24.

Tilting of the ball nut body is ensured by the spherical surfaces. The spherical surfaces are provided with axial play. The axial play is compensated by the spring rings and the rubber rings.

In order to ensure the transmission of drive torque from the belt pulley to the ball nut, the belt pulley is pressed onto the intermediate ring. To increase the possible transmissible torque, it is possible for suitable contours, for example protuberances, to be provided on the contact surfaces to achieve a positive connection. The drive torque transmission from the intermediate ring to the inner ring is made possible via the pressed-in spring rings. These are configured by their shape such that, during tilting of the ball nut, the changes in the cavity are compensated.

The bearing according to the invention allows the ball nut to tilt together with the threaded spindle during a strong tilting load on the ball screw drive, for example during the curb pressure test. Here, it is guaranteed that the belt pulley does not tilt as well during the tilting of the ball nut. As a result, the drop in tension mentioned at the outset can be effectively avoided namely by the fact that the belt bears constantly over its whole area on the belt pulley during operation. By decoupling the belt pulley from the ball nut, the rotary force exerted on the ball nut by an assist motor can be permanently maintained. Furthermore, the bearing has an axial damping means which prevents noise generation in the bearing (rattling).

What is claimed is:

1. A bearing for a ball screw drive comprising:
    a ball nut that is rotatable about a longitudinal axis and configured to receive a threaded spindle in a concentric manner;
    an inner ring in which the ball nut is disposed, wherein an outer circumferential surface of the inner ring is convex at least in some regions, wherein the inner ring is connected to and rotatable with the ball nut and is immovable in an axial direction;
    an intermediate ring in which the ball nut is at least partially disposed, wherein an inner circumferential surface of the intermediate ring is concave at least in some regions, wherein the intermediate ring is connected to the inner ring via spring elements for rotation with the inner ring;
    an outer ring in which the ball nut is at least partially disposed; and a belt pulley connected to and rotatable with the intermediate ring, wherein the ball nut is tiltable with respect to the belt pulley.

2. The bearing of claim 1 wherein the spring elements comprise two spring rings, each of which is disposed in a cavity so as to be radially symmetrical about the longitudinal axis in an unloaded state.

3. The bearing of claim 2 wherein each spring element has a shape such that each spring element compensates for a change in shape of the respective cavity that occurs during tilting of the ball nut.

4. The bearing of claim 2 wherein the spring rings have an M-shaped profile that is formed by two horizontal regions and a vertical region with a centrally-arranged bead.

5. The bearing of claim 4 wherein the bead of the spring rings forms a seat for a damping body.

6. The bearing of claim 5 wherein the damping body is an elastomer ring.

7. The bearing of claim 1 wherein the inner ring has a recess on an outer circumferential side and the intermediate ring has a recess on an inner circumferential side, with the recesses configured to receive the spring elements.

8. The bearing of claim 1 wherein the inner ring is disposed in a rotationally fixed manner and axially secured on the ball nut by a union nut.

9. The bearing of claim 1 wherein the belt pulley is positively connected to the intermediate ring.

10. An electromechanical power steering system comprising a bearing for a ball screw drive, the bearing comprising:
- a ball nut that is rotatable about a longitudinal axis and configured to receive a threaded spindle in a concentric manner;
- an inner ring in which the ball nut is disposed, wherein an outer circumferential surface of the inner ring is convex at least in some regions, wherein the inner ring is connected to and rotatable with the ball nut and is immovable in an axial direction;
- an intermediate ring in which the ball nut is at least partially disposed, wherein an inner circumferential surface of the intermediate ring is concave at least in some regions, wherein the intermediate ring is connected to the inner ring via spring elements for rotation with the inner ring;
- an outer ring in which the ball nut is at least partially disposed; and
- a belt pulley connected to and rotatable with the intermediate ring, wherein the ball nut is tiltable with respect to the belt pulley.

* * * * *